April 22, 1947.   A. KOCEVAR   2,419,453
REDUCING COUPLING
Filed June 8, 1945

INVENTOR.
ANTHONY KOCEVAR
BY John Mahoney
attorney

Patented Apr. 22, 1947

2,419,453

UNITED STATES PATENT OFFICE 2,419,453

REDUCING COUPLING

Anthony Kocevar, Garfield Heights, Ohio

Application June 8, 1945, Serial No. 598,335

2 Claims. (Cl. 285—160)

My invention relates to liquid distribution systems and more particularly to reducing couplings for connecting pipes of different diameters.

In connecting pipes having different diameters, it has heretofore been the practice to utilize couplings provided with internal threads. When reducing couplings having internal threads are utilized in water distribution systems, however, the threads are subject to corrosion which not only causes a rapid wearing away of the metal of which the coupling is formed but also contaminates the liquid being conducted through the distribution system.

It has also been proposed to utilize couplings having external threads and to provide an abrupt change in the bore of the coupling to compensate for the difference in diameter between the pipes which are to be connected. When couplings of such type are utilized in liquid distribution systems, the abrupt change in the internal diameter of the bore of the coupling restricts the flow of the liquid and causes the formation of eddy currents and the deposit of impurities which impede still further the passage of the liquid through the coupling.

It is an object of the present invention to provide in a liquid distribution system, a pair of pipes of different diameters and a coupling for connecting said pipes having an internal bore which gradually decreases in diameter from the end which is connected to the larger pipe to the end which is connected to the smaller pipe.

Another object of the invention is to provide an improved coupling, the interior bore of which gradually decreases in size from one end to the other end.

A further object of my invention is to provide a reducing coupling formed of integral parts and provided with two nipple parts of different diameter, each of which is provided with external threads for connecting oppositely disposed pipes of different diameters and the bore of which coupling gradually decreases in diameter from the end formed of the larger nipple part to the end formed of the smaller nipple part.

My invention will be better understood by reference to the accompanying drawings in which.

As illustrated in Figs. 1 to 5, inclusive, my improved coupling comprises a central portion 1 provided with a tapered bore 2 and nipple parts 3 and 4 extending in opposite directions from the central portion. To facilitate threading the coupling into one or both of the pipes, it is provided with a surface shaped to be engaged by a tool or wrench which as illustrated is hexagonal in form.

Figure 1:
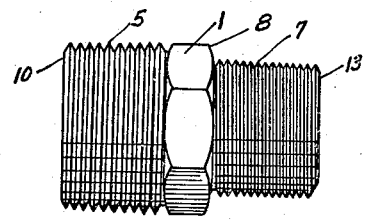
Fig. 1 is a side elevational view of my improved coupling.
Figure 2:
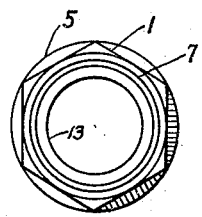
Fig. 2 is an end view of the coupling shown in Fig. 1.
Figure 3:
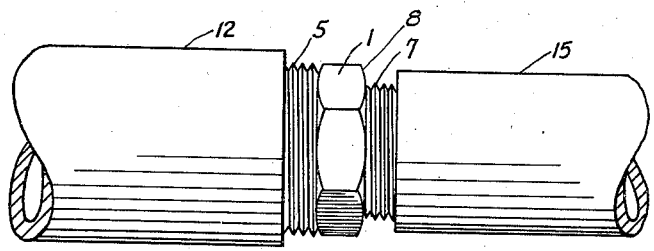
Fig. 3 is a side elevational view of a pair of pipes of different diameters connected together by my improved coupling.
Figure 4:
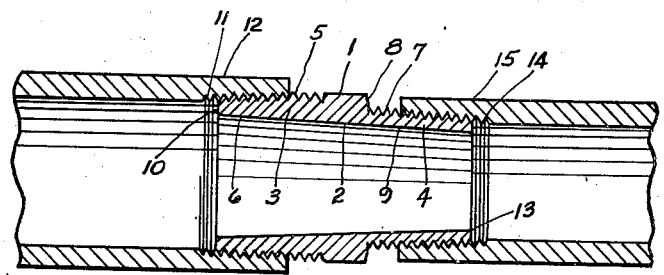
Fig. 4 is a central sectional view through the pipes and coupling shown in Fig. 3.
Figure 5:
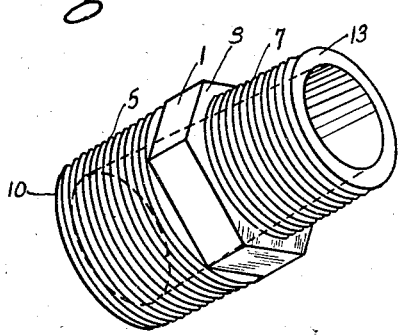
Fig. 5 is a perspective view of the coupling shown in Figs. 1 to 4, inclusive.

The outer surface of nipple portion 3 is provided with external threads 5 which taper inwardly from the outer apices of the central portion as indicated in Figs. 1, 2 and 5, and its bore is tapered outwardly as indicated by the numeral 6 to form a continuation of the taper of the bore of the central portion. Nipple part 4 is also provided with external inwardly tapering threads 7 which are smaller in external diameter than the threads 5 and extend from the inwardly extending edge 8 of the central portion. The bore 9 of the nipple part 7 is inclined inwardly to form a continuation of the bore 2 of the central portion.

Because of the enlarged central portion of the coupling and its two nipple parts, each provided with a set of tapering external threads, one of which is smaller in diameter than the other, I provide a comparatively strong coupling having an internal bore which gradually decreases in diameter from the edge 10 which is threaded to the internally outwardly tapering threads 11 on the larger pipe 12 to the edge 13 which is threaded to internally outwardly tapering threads 14 on the smaller pipe 15. By this construction, it will also be noted that the central portion which is shaped to be engaged by a tool is comparatively thick and is therefore able to resist torsional forces applied thereto and because of the inwardly inclined bore of the nipple portion 4 which carries threads 7, this portion of the nipple is substantially uniform in thickness throughout its length and is not weakened by the inward taper of threads 7.

Figure 6:
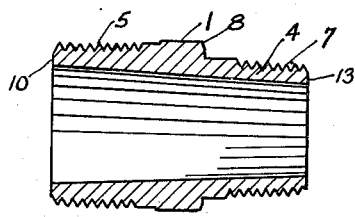
Fig. 6 is a cross sectional view of a modified form of coupling.

Although in Figs. 1 to 5, both sets of external threads extend up to the hexagonally-shaped central portion 1, this is not necessary as threads 5 may occupy only a portion of the external surface of the coupling between edge 10 and nut 1 and threads 7 may occupy only a portion of the external surface of the coupling between edge 13 and nut 1 as indicated more clearly in Fig. 6 of the drawing.

What I claim is:

1. A coupling having a central portion, one of the outer edges of which extends inwardly, and two sets of external threads of different diameters, one set of which is tapered inwardly from the outer edge of the central portion toward one end of the coupling and the other set of which is tapered inwardly from the inner edge of the central portion toward the other end of said coupling, and said coupling having an internal bore which gradually decreases in diameter from one end to the other end of said coupling.

2. A coupling including a central portion of greater thickness than the other portions and being shaped to be engaged by a tool and said central portion being provided with an inwardly extending edge and a tapered bore, and two nipple parts with the outer surface of one of said nipple parts being extended in one direction from the outer edge of the central portion and tapered inwardly and provided with external threads and the inner surface of which is gradually tapered outwardly to form a continuation of the bore of the central portion of the coupling, and the other nipple part being extended in the opposite direction from the inner edge of said central portion with its outer surface having inwardly tapered external threads and its inner surface being gradually tapered inwardly to form a continuation of the bore of the first nipple part and the bore of the central portion, to thereby provide an internal bore which gradually decreases in diameter from one end of the coupling to the other end of the coupling.

ANTHONY KOCEVAR.

REFERENCES CITED

The following references are of record in the file of this patent:

UNITED STATES PATENTS

| Number | Name | Date |
|---|---|---|
| 1,326,626 | Wolfe | Dec. 30, 1919 |
| 1,932,427 | Stone | Oct. 31, 1933 |

FOREIGN PATENTS

| Number | Country | Date |
|---|---|---|
| 2,761 | British | Feb. 16, 1889 |